(12) United States Patent
Hyndman et al.

(10) Patent No.: US 9,306,880 B1
(45) Date of Patent: Apr. 5, 2016

(54) METHOD AND APPARATUS FOR ENABLING PEOPLE TO FIND EACH OTHER AND STAY TOGETHER IN VIRTUAL ENVIRONMENTS

(75) Inventors: Arn Hyndman, Ottawa (CA); Albert Reiche, Kanata (CA)

(73) Assignee: AVAYA INC., Basking Ridge, NJ (US)

( * ) Notice: Subject to any disclaimer, the term of this patent is extended or adjusted under 35 U.S.C. 154(b) by 761 days.

(21) Appl. No.: 12/344,891

(22) Filed: Dec. 29, 2008

(51) Int. Cl.
  *G06F 15/16* (2006.01)
  *H04L 12/58* (2006.01)

(52) U.S. Cl.
  CPC ....... *H04L 51/046* (2013.01); *A63F 2300/5533* (2013.01); *A63F 2300/5553* (2013.01)

(58) Field of Classification Search
  USPC .......... 709/204, 205; 715/700, 705, 706, 707, 715/716, 751, 753, 757, 759
  See application file for complete search history.

(56) References Cited

U.S. PATENT DOCUMENTS

| | | | |
|---|---|---|---|
| 2003/0177187 A1* | 9/2003 | Levine et al. | 709/205 |
| 2004/0030787 A1* | 2/2004 | Jandel et al. | 709/229 |
| 2004/0143852 A1* | 7/2004 | Meyers | 725/133 |
| 2005/0086612 A1 | 4/2005 | Gettman et al. | |
| 2010/0060649 A1* | 3/2010 | Haggar et al. | 345/474 |

OTHER PUBLICATIONS

"The Players' Guide to the Cities/User Interface/Map Window". Posted Dec. 8, 2007 on http://cityofheroes.wikia.com/wiki/The_Players'_Guide_to_the_Cities/User_Interface/Map_Window.*
"Group Calendar Instructions", downloaded from <http://wobbleworks.com/groupcalendar/manual/>. Posted on Dec. 7, 2004.*

* cited by examiner

*Primary Examiner* — Scott B Christensen
(74) *Attorney, Agent, or Firm* — Anderson Gorecki & Rouille, LLP (57) ABSTRACT

A directory maintains a record of where a user is located within a plurality of virtual environments. As the user moves within a virtual environment or between virtual environments the user's location is updated in the directory. The user (invitation sender) may send invitations to other users (invitation recipients) to meet the user at a particular time. The invitation may be implemented as a URI which may be sent by Instant Message, E-mail, chat, etc. When an invitation recipient clicks on the URI to accept the invitation, the invitation will be validated and, if valid, enable the invitation recipient to move to the current location of the invitation sender. Invitations may be to meet the invitation sender or to follow the invitation sender. Where the invitation is to follow the invitation sender, a group may be formed that can move within and between virtual environments.

15 Claims, 5 Drawing Sheets

METHOD AND APPARATUS FOR ENABLING PEOPLE TO FIND EACH OTHER AND STAY TOGETHER IN VIRTUAL ENVIRONMENTS

CROSS-REFERENCE TO RELATED APPLICATIONS

None

BACKGROUND OF THE INVENTION

1. Field of the Invention

The present invention relates virtual environments and, more particularly, to a method and apparatus for enabling people to find each other and stay together in virtual environments.

2. Description of the Related Art

Virtual environments simulate actual or fantasy 3-D environments and allow for many participants to interact with each other and with constructs in the environment via remotely-located clients. One context in which a virtual environment may be used is in connection with gaming, although other uses for virtual environments are also being developed.

In a virtual environment, an actual or fantasy universe is simulated within a computer processor/memory. Multiple people may participate in the virtual environment through a computer network, such as a local area network or a wide area network such as the Internet. Each player selects an "Avatar" which is often a three-dimensional representation of a person or other object to represent them in the virtual environment. Participants send commands to a virtual environment server that controls the virtual environment to cause their Avatars to move within the virtual environment. In this way, the participants are able to cause their Avatars to interact with other Avatars and other objects in the virtual environment.

A virtual environment often takes the form of a virtual-reality three dimensional map, and may include rooms, outdoor areas, and other representations of environments commonly experienced in the physical world. The virtual environment may also include multiple objects, people, animals, robots, Avatars, robot Avatars, spatial elements, and objects/environments that allow Avatars to participate in activities. Participants establish a presence in the virtual environment via a virtual environment client on their computer, through which they can create an Avatar and then cause the Avatar to "live" within the virtual environment.

As the Avatar moves within the virtual environment, the view experienced by the Avatar changes according to where the Avatar is located within the virtual environment. The views may be displayed to the participant so that the participant controlling the Avatar may see what the Avatar is seeing. Additionally, many virtual environments enable the participant to toggle to a different point of view, such as from a vantage point outside of the Avatar, to see where the Avatar is in the virtual environment.

The participant may control the Avatar using conventional input devices, such as a computer mouse and keyboard. The inputs are sent to the virtual environment client which forwards the commands to one or more virtual environment servers that are controlling the virtual environment and providing a representation of the virtual environment to the participant via a display associated with the participant's computer.

Depending on how the virtual environment is set up, an Avatar may be able to observe the environment and optionally also interact with other Avatars, modeled objects within the virtual environment, robotic objects within the virtual environment, or the environment itself (i.e. an Avatar may be allowed to go for a swim in a lake or river in the virtual environment). In these cases, client control input may be permitted to cause changes in the modeled objects, such as moving other objects, opening doors, and so forth, which optionally may then be experienced by other Avatars within the virtual environment.

"Interaction" by an Avatar with another modeled object in a virtual environment means that the virtual environment server simulates an interaction in the modeled environment, in response to receiving client control input for the Avatar. Interactions by one Avatar with any other Avatar, object, the environment or automated or robotic Avatars may, in some cases, result in outcomes that may affect or otherwise be observed or experienced by other Avatars, objects, the environment, and automated or robotic Avatars within the virtual environment.

A virtual environment may be created for the user, but more commonly the virtual environment may be persistent, in which it continues to exist and be supported by the virtual environment server even when the user is not interacting with the virtual environment. Thus, where there is more than one user of a virtual environment, the environment may continue to evolve when a user is not logged in, such that the next time the user enters the virtual environment it may be changed from what it looked like the previous time.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, workplace collaboration, and other types of interactions between groups of users and between businesses and users.

As Avatars encounter other Avatars within the virtual environment, the participants represented by the Avatars may elect to communicate with each other. For example, the participants may communicate with each other by typing messages to each other or an audio bridge may be established to enable the participants to talk with each other.

As virtual environments proliferate, it becomes harder for people to find each other. Likewise, people may want to meet each other and stay together as a group. Where the group is to jump between virtual worlds, this becomes difficult. Accordingly, it would be advantageous to provide a way for people to meet each other and then stay together as they negotiate through one or more virtual environments.

Coincident with this is a need for people to not be found when they don't want to be found. People may want to avoid letting everyone know where they will be in the virtual environment because they may want to not be interrupted or tracked as they negotiate through the virtual environment. For example, a person may want to avoid their employer, family, ex-spouse, particular acquaintances, or other people for various reasons. Additionally, predators may seek out or stalk people in virtual environments, so people need to be able to retain a level of privacy.

To accommodate these competing needs, user directories have been created. For example, a particular directly may track where users are in the virtual environment and store users' locations in a directory that is accessible by other users. While this allows users to be found, it does not address the privacy concerns, since anyone can find anyone at any time simply by looking for the person in the directory. Additionally, since the directory is specific to a particular virtual environment, it does not help find people who may be in different virtual environments.

Another solution that has been tried also uses a directory, but uses restricted access to start to protect users' privacy. Each user is allowed to designate a group of other users as "friends" to enable those people to find the user in the virtual environment. This is better from a privacy standpoint, in that only selected individuals may find the user through the directory. However, it still is somewhat lacking in that once a user has designated someone else as a "friend" the other person can find the user at any point in time. There may be times when the user would prefer to not be found. Unfortunately, this solution does not enable that to occur. Additionally, similar to the previous directory solution, this solution only works where all of the users belong to the same directory, and for a particular virtual environment. Where not everyone belongs to the directory the directory doesn't work. Similarly, where the user would like to have a list of friends in more than one virtual environment, the user will need to duplicate the friend list to each of the virtual environments.

Another way that privacy and location issues have attempted to be solved is to allow users to create groups. Typically, a particular user will construct a group of people who wish to travel together in the virtual environment. The group may have a leader who is responsible for selecting where the group will go within the virtual environment. Groups of this nature take effort to set up and therefore only really make sense for long lived activities, common in massively multiplayer on-line games, where a group may stay together for hours, days, or longer. Since setting up a group is cumbersome, it is frequently difficult to justify the effort required to establish a group when the intended activity is to be short-lived, such as a quick 15 minute tour or meeting. Additionally, groups only are supported within a particular virtual environment—they do not span between virtual environments—and can typically only be formed after all users have already found each other. Thus, the group members will need to communicate with each other off-line to enable the group to be assembled. Once the group has been assembled, the lifespan of the group is manually managed.

SUMMARY OF THE INVENTION

A method and apparatus for enabling people to find each other and stay together in virtual environments is provided. In one embodiment, a directory maintains an update of where users are located within a plurality of virtual environments. As the user moves within a virtual environment or between virtual environments the user's location is updated in the directory. The user's location may be implemented using Uniform Resource Identifiers (URIs) and registered by the user's virtual environment client(s) as the user moves between the various virtual environments. The user's location is kept private in the directory and not available to other users.

The user may send out invitations asking other users to meet him a particular time. The invitations may be restricted to a particular time period, to particular other users, may specify that the invitation is a single-use invitation or a multiple use invitation, or may specify other restrictions. Upon creation of an invitation, the directory generates a URI which the user may send to the other users. The URI may be sent by Instant Message, E-mail, through a chat engine provided by the virtual environment, or in another manner.

In one embodiment, the URI is a Uniform Resource Locator (URL) such as a HTTP: URL. By implementing the URI as a web based URL (link), the user may click on the link contained in an instant message, email, etc., to have their browser go to the URL. The URL is hosted by the directory. Thus, in this embodiment, at the designated time, a person holding an invitation may click on the URI. Clicking on the URI launches a request to the directory to obtain the location of the user who created the invitation.

When the directory receives the invitation request, the directory will check the constraint data associated with the invitation to determine whether the invitation request is valid, i.e. to determine if the invitation pertains to the user who submitted the request and whether the invitation has been tendered at the correct time. If the invitation request is not valid, the directory will return a web page indicating that the invitation isn't valid, not authorized for this user, or another similar web page. If the invitation is valid, the directory will issue an HTTP redirect to send the user to the meet-up URI.

The invitation may be used to enable people to meet or to form a group. Where the invitation is to form a group, each time the person who sent out the invitation moves to a new location (and updates the location in the directory), the directory will pass the new location information to the group members. The new location may be implemented as a URI, such that the new URI is forwarded to each of the group members. The group members may use this automatically or manually to follow the user who created the group. Since the directory spans virtual environments, this enables people to find each other between virtual environments and to follow each other between virtual environments.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
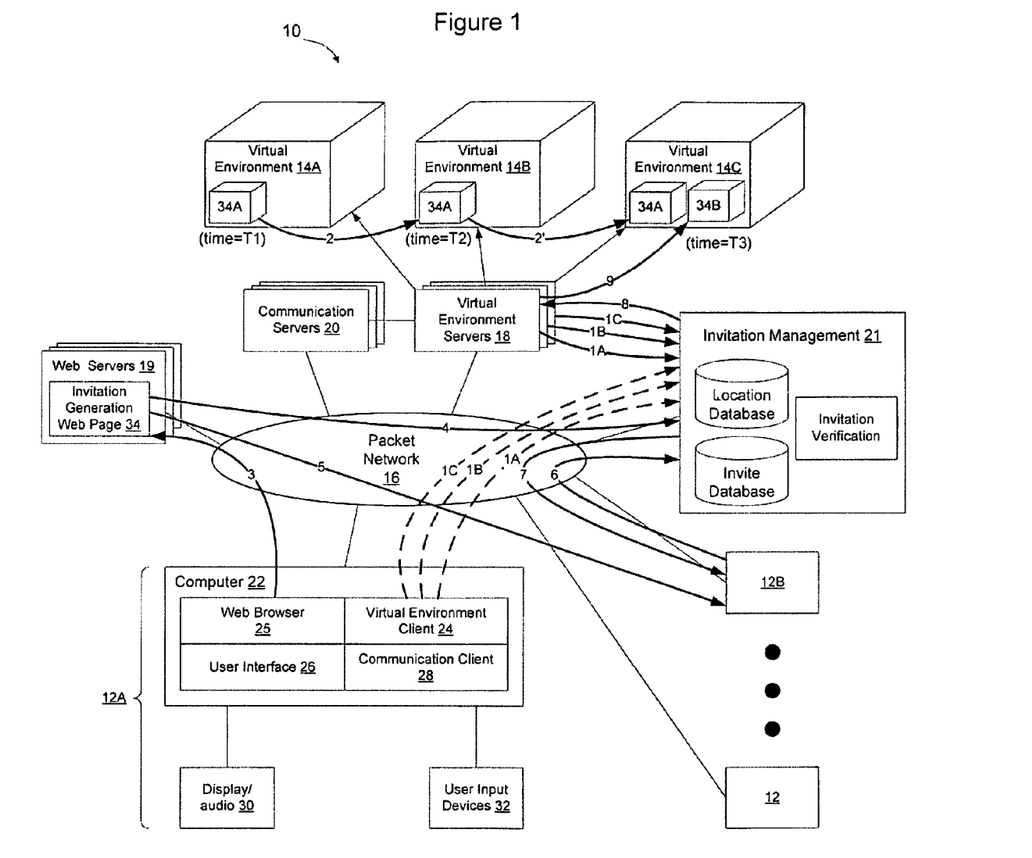
FIG. 1 is a functional block diagram of a portion of an example system that may be used to enable people to find each other and stay together in virtual environments according to an embodiment of the invention.

FIG. 1 shows a portion of an example system 10 that may enable people to find each other and stay together as they negotiate within a virtual environment and between virtual environments. In the example system shown in FIG. 1, a user 12 may access one or more virtual environments 14A, 14B, 14C from their computer 22 over a packet network 16 or other common communication infrastructure. The virtual environments are implemented by one or more virtual environment servers 18. Communication sessions between the users 12 may be implemented by one or more communication servers 20.

According to an embodiment of the invention, an invitation management system may be implemented to enable users to send invites to other users to enable the other users to find them and stay with them as they navigate between and within virtual environments. Different functions of the invitation management system may be implemented by different logical/physical servers on the network 16 or may be implemented by the same server. In the embodiment shown in FIG. 1, the invitation management system includes two separate components: a web server 19 and a location directory 21. In the embodiment shown in FIG. 5, the invitation management system has the components integrated and hosted on a server. Other architectures may be implemented as well and the functionality of the invitation management system may be split up as desired between logical/physical components on the network.

The virtual environment servers may host multiple virtual environments which may be related or may be completely separate. For example, a given virtual environment server may only host a particular number of users, depending on the complexity of the virtual environment and the processing capabilities of the server. Thus, it may be necessary to use more than one server to implement a particular virtual environment. Where more than one server is used, each server may host an entire instance of the virtual environment and a subset of the total number of users or, alternatively, each server may host a particular portion of the virtual environment.

Where there are multiple instances of a virtual environment, the Avatars in one instance are generally unaware of Avatars in the other instance. Conventionally, each instance of the virtual environment may be referred to as a separate world. Avatars in a given world are allowed to communicate with other users that also have Avatars in the same world over a communication session hosted by the communication server 20.

Similarly, there may be many different virtual environments that are created for different purposes and are independent of each other. As noted above, virtual environments may be created for multitudes of different purposes. A virtual environment that is created for a Massively Multiplayer Online Game (MMOG) will have its own coordinate space within which users are able to participate in the game. A virtual environment that is created for business use, to enable people to host meetings and get together to collaboratively arrive at solutions to business problems, will also have its own coordinate space within which users may meet and discuss business. Another virtual environment may be established for social networking, to enable users to meet each other and get to know each other. As may be expected, depending on the purpose, the virtual environments may be dramatically different in size, complexity, and features. Additionally, the particular abilities of the Avatars within each virtual environment may be very different. Accordingly, the virtual environments 14A, 14B, 14C may be any type of virtual environment and the invention is not limited to use with a particular type of virtual environment.

Generally, a virtual environment will have its own distinct three dimensional coordinate space. Avatars representing users may move within a three dimensional coordinate space of a particular virtual environment and interact with objects and other Avatars within the virtual environment. Users may also move from one virtual environment to another. Users may be present in one virtual environment at a time or, alternatively, may be engaged in multiple virtual environments at the same time. For example, a user may have one virtual environment client logged into the business virtual environment and a second virtual environment client logged into the MMOG virtual environment. Thus, a particular user may have multiple simultaneous presences. If a user has more than one virtual presence, they will need to register each presence separately with the directory. When the user sends out an invitation, it will be to meet up with a particular virtual presence.

When a user logs into a virtual environment, the virtual environment server which maintains that virtual environment will generate a visual presentation for the user based on the location of the user's Avatar within the virtual environment. The view may depend on the direction in which the Avatar is facing and the selected viewing option, such as whether the user has opted to have the view appear as if the user was looking through the eyes of the Avatar (first person point of view), or whether the user has opted to pan back from the Avatar to see a three dimensional view of where the Avatar is located and what the Avatar is doing in the three dimensional computer-generated virtual environment (third person point of view).

Each user 12 has a computer 22 that may be used to access the three-dimensional computer-generated virtual environment. The computer 22 will run a virtual environment client 24 and a user interface 26 to the virtual environment. The user interface 26 may be part of the virtual environment client 24 or implemented as a separate process. A separate virtual environment client may be required for each virtual environment that the user would like to access, although a particular virtual environment client may be designed to interface with multiple virtual environment servers. A communication client 28 is provided to enable the user to communicate with other users who are also participating in the three dimensional computer-generated virtual environment. The communication client may be part of the virtual environment client 24, the user interface 26, or may be a separate process running on the computer 22. Other applications may be running on the user computer as well, such as web browser 25.

The user may see a representation of a portion of the three dimensional computer-generated virtual environment on a display/audio 30 and input commands via a user input device 32 such as a mouse, touch pad, or keyboard. The display/audio 30 may be used by the user to transmit/receive audio information while engaged in the virtual environment. For example, the display/audio 30 may be a display screen having a speaker and a microphone. The user interface generates the output shown on the display under the control of the virtual environment client, and receives the input from the user and passes the user input to the virtual environment client. The virtual environment client passes the user input to the virtual environment server which causes the user's Avatar 34 or other object under the control of the user to execute the desired action in the virtual environment. Thus, the user may control a portion of the virtual environment, such as the person's Avatar or other objects in contact with the Avatar, to change the virtual environment for the other users of the virtual environment.

Typically, an Avatar is a three dimensional rendering of a person or other creature that represents the user in the virtual environment. The user selects the way that their Avatar looks when creating a profile for the virtual environment and then can control the movement of the Avatar in the virtual environment such as by causing the Avatar to walk, run, wave, talk, or make other similar movements. Thus, the block 34 representing the Avatar in the virtual environment 14, is not intended to show how an Avatar would be expected to appear in a virtual environment. Rather, the actual appearance of the Avatar is immaterial since the actual appearance of each user's Avatar may be expected to be somewhat different and customized according to the preferences of that user. Since the actual appearance of the Avatars in the three dimensional computer-generated virtual environment is not important to the concepts discussed herein, Avatars have generally been represented herein using simple geometric shapes or two dimensional drawings, rather than complex three dimensional shapes such as people and animals.

FIG. 1 contains arrows 1-9 that show a flow of information within the system 10 that will enable users to be found and stay together as a group according to an embodiment of the invention. As shown in FIG. 1, at time T1, the user is represented by an Avatar 34A in virtual environment 14A. As the user navigates within virtual environment 34A, the user's location within the virtual environment will be registered by the virtual environment server responsible for the virtual environment 14A to the location directory 21 (arrow 1A). Alternatively, the user's virtual environment client 24 may register the user's location with the location directory 21.

At time T2, in this example, it will be assumed that the user will move from the first virtual environment 14A to a second virtual environment 14B (arrow 2). The second virtual environment may be supported by the same virtual environment server or by a different virtual environment server. Whichever server is responsible for the second virtual environment 14B will update the user's presence location in the location directory 21 (arrow 1B). Alternatively, the virtual environment client may update the user's presence location in the location directory. Similarly, at time T3 it will be assumed that the user moves to yet a third virtual environment 14C (arrow 1B). The user's location within the third virtual environment will be provided to the location directory 21 (arrow 1C).

Whenever a user moves from one virtual environment to another, the user's location may be updated in the location directory 21. Similarly, as the user moves within the virtual environment, the user's location may be updated periodically. The user's location may be provided as a Uniform Resource Indicator (URI), one example of which is a Uniform Resource Locator (URL), that the virtual environment server may use to determine the user's location within the virtual environment.

Many virtual environments have zones or logical areas that are created to facilitate development of the virtual environment. As Avatars transition between zones, the user's location within the virtual environment may be updated to the location directory. Other divisions within the virtual environment may be used to trigger an update to the location directory 21, such as movement of the Avatar 34A between rooms in the virtual environment. The user's location may also be updated periodically based on time, or in any other desired manner.

Providing updates to the location directory (arrows 1A-1C) enables the location directory to know where the user is located. This may be implemented across any virtual environment that is associated with the invitation management system, so that the user may be found wherever the user is located within the multiple virtual environments that have opted to use the invitation management system. Although the invitation management system may be used within a particular virtual environment, the invitation management system preferably may span multiple virtual environments to provide a more universal platform for locating users as the users move between and within multiple virtual environments.

In one embodiment, the user's location is assigned a URI that may be used by the virtual environment client or server to determine where the user is located within the virtual environment. The user's location URI is transmitted to and stored in the location directory. The URI points to a particular virtual environment server responsible for the user and, within the virtual environment server, to a particular part of the virtual environment hosted by that particular virtual environment server.

As discussed above, the location directory 21 enables the users to be found wherever they are located within one or more virtual environments. The invitation management system uses this location directory to enable other users to find the user. To control which users can find each other, an invitation generation system and invitation validity verification system are provided. The invitation generation system enables users to send invitations to other users, and the invitation validity verification system enables the invitation management system to protect users against fraudulent, invalid, and untimely invitations. Each of these systems will be discussed in greater detail below.

In the following description, a user that would like to send an invitation to one or more other users will be referred to herein as the "invitation sender." A person who receives an invitation will be referred to herein as the "invitation recipient." Of course, every person may be allowed to both send and receive invitations. Thus, the term "invitation sender" and "invitation recipient" will refer to a particular invitation transaction.

Assume, as shown in FIG. 1, that the user 12A (invitation sender) would like to send an invitation to user 12B (invitation recipient) to meet at time T3. The user 12A in this example is not certain where he will be at time T3 but would like user 12B to be able to find him regardless of where he is at that point in time.

Figure 6:
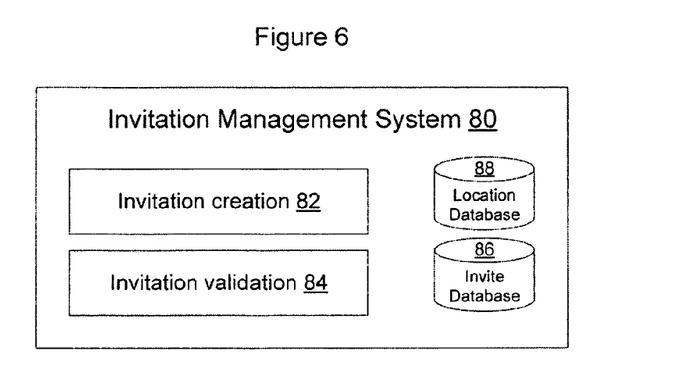
FIG. 6 is a software diagram on invitation management system according to an embodiment of the invention.

User 12A will use his web browser 25 to access a web server 19 running an invitation generation web page 34 (arrow 3). Alternatively, as shown in FIG. 6, the user 12A may access the invitation creation system 82 of the invitation management system 80. The invitation sender 12A will use the invitation generation web page 34/invitation creation system 82 to generate an invitation to the invitation recipient 12B. After the invitation has been created, it will be sent to the location directory 21 (arrow 4) and to the invitation recipient 12B (arrow 5). In the example shown in FIG. 1, the invitation is shown as being sent from the web server directly to the invitation recipient 12B. Alternatively, the invitation could be returned to the invitation sender to enable the invitation sender to pass the invitation to the invitation recipient.

In one embodiment, the invitation includes a URI specifying a time, optionally place, and any constraints associated with the invitation. Where the invitation is passed to the invitation sender, the invitation sender may paste the URI into an instant message, e-mail, chat engine, or other communication session, to enable the URI to be conveyed to the invitation recipient. Similar communication systems may be used to transmit the invitation from the web server to the invitation recipient. A copy of the invitation will also be sent to the location directory 21 to be stored in the invite database. Where a unified invitation management system 80 is used (see FIG. 6), the invitation may be populated directly from the invitation creation system 82 to the invitation database 86.

In one embodiment, the URI is a Uniform Resource Locator (URL) such as a HTTP: URL. By implementing the URI as a web based URL (link), the user may click on the link contained in an instant message, email, etc., to have their browser go to the URL. The URL is hosted by the directory. Thus, in this embodiment, at the designated time or close to the designated time, a person holding an invitation may click on the URI. Clicking on the URI launches an invitation acceptance response (arrow 6) to be sent to the location directory 21.

When the directory receives the invitation acceptance response, the directory will check the constraint data associated with the invitation to determine whether the invitation request is valid, i.e. to determine if the invitation pertains to the user who submitted the request and whether the invitation has been tendered at the correct time. If the invitation request is not valid, the directory will return a web page indicating that the invitation isn't valid, not authorized for this user, or another similar web page. If the invitation is valid, the directory will issue an HTTP redirect to send the user to the meet-up URI.

For example, as shown in FIG. 1 the invitation management system may include an invitation validity verification system 84 that checks the invitation acceptance response against an invitation database 86. If the parameters associated with the invitation acceptance response are within the parameters specified in the original invitation, the location directory 21 (location database 88) will perform a redirect (arrow 8) to cause the invitation recipient's Avatar 34B to meet with the Avatar 34A of the invitation sender (arrow 9).

In connection with checking the invitation parameters, the invitation management system may check to determine that the correct user has tendered the invitation, that the invitation has been tendered at the right time, and that other parameters associated with the tendered invitation are correct. If the tender is not valid (wrong user, wrong time, too many follow attempts, etc.) the user directory will return a web page indicating the problem. If the request is at the wrong time, but only slightly before the right time (less than a few hours off) the web page can offer to perform the redirect when the time occurs, to automatically send the user to the meeting at the right time.

The invitation acceptance response is a message generated by the invitation recipient when the invitation recipient clicks on the URI. The message may be a standard HTTP request containing an indication of the URI. Optionally, the message may also carry an invitation identifier, information about the user such as the invitation recipient's universally unique identifier, and any other desired information. The invention is not limited to the particular way in which the invitation acceptance response is implemented.

In the example shown in FIG. 1 the invitation sender generated an invitation to an invitation recipient to ask the invitation recipient to join him. The invention is not limited in this regard as other types of invitations may be sent as well. For example, the invitation sender may want to send an invitation to join the invitation recipient at the invitation recipient's location. The invitation sender may specify this option when creation of the invitation and, if accepted by the invitation recipient, enable the invitation sender to be ported to wherever the invitation recipient is at the time. Other types of invitations may be created as well.

Figure 2:
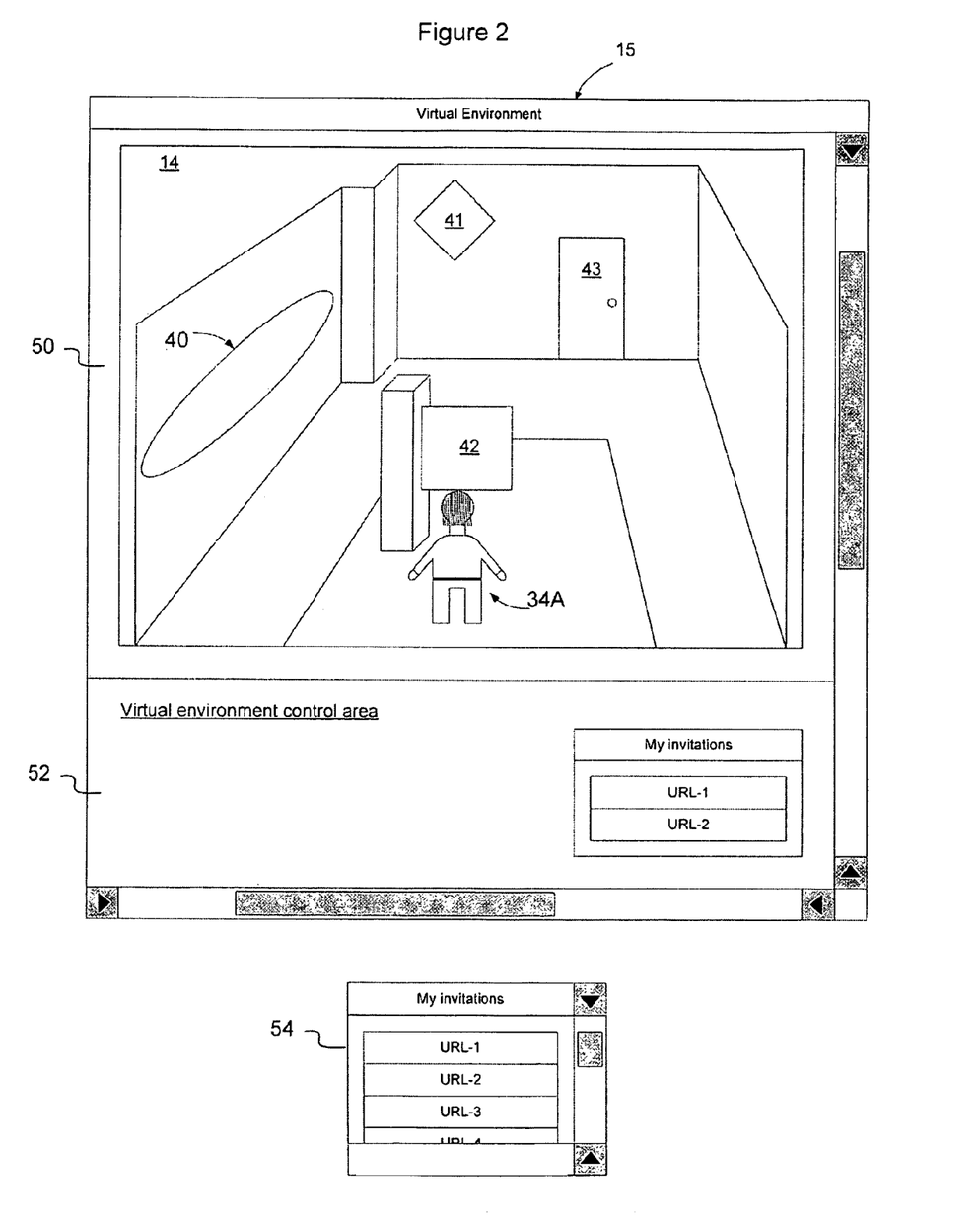
FIG. 2 is a block diagram showing an example virtual environment and invitation management system according to an embodiment of the invention.

FIG. 2 shows an example three dimensional computer-generated virtual environment. In the example shown in FIG. 2, an Avatar 34A is shown standing in front of a sign 42 that is attached to a post. The user may use the user interface 26 to cause the Avatar to walk around within the virtual environment to approach objects within the virtual environment. For example, the user may cause the Avatar to walk up to the sign, may cause the Avatar to walk over to the oval-shaped window 40, to move toward the diamond-shaped window 41, door 43, or elsewhere in the virtual environment. The user may be presented with a view of the virtual environment that is set back from the Avatar (as shown in FIG. 2) to see where the Avatar is located within the virtual environment. Alternatively, the user may be presented with a view that represents what the Avatar is seeing in the virtual environment, as if the user were looking through the Avatar's eyes into the virtual environment.

In the example shown in FIG. 2, the virtual environment has been opened in its own window. The invention is not limited in this regard as the virtual environment may be opened in other ways as well, such as by causing the virtual environment to be embedded in a web browser.

The virtual environment window has an area 50 to display the virtual environment 14 and a virtual environment control area 52 that contains controls for the virtual environment. The control area 52 may enable the user to access particular features that may control how the Avatar is behaving within the virtual environment, such as to cause the Avatar to fly, run, walk, or otherwise change the mode of transportation within the virtual environment, enable the Avatar to have access to objects the Avatar has acquired within the virtual environment, etc. The control area may be formed on the bottom, top, or elsewhere around the virtual environment content.

According to an embodiment of the invention, the user may also have access to invitations that may be used to locate other users within one of the three dimensional virtual environments. The invitations that are specific to that virtual environment may appear within the control area of the virtual environment to enable the user to access the invitations through the virtual environment. Since invitations are not specific to a particular virtual environment, the invitations may alternatively be implemented to be accessible in a separate window 54. For example, the invitations may be shown as a list of links (URIs) optionally with descriptive text, that will enable the user to jump to the desired location in a virtual environment. The invitations may be organized by time, sender, or in any other desired manner.

In one embodiment, the invitations may be added to a calendaring program to enable invitations to be added to the user's calendar. Calendar programs are commonly used to allow users to keep track of important meetings and other obligations. Frequently, the calendar program may be integrated with an e-mail program to enable users to receive e-mail meeting invitations that may be accepted and automatically populated to their calendar. If desired, the calendar may then generate reminders for the user at the appropriate time to help the user remember the meeting and provide details such as the telephone conference number that the user will need to attend the meeting.

Figure 3:
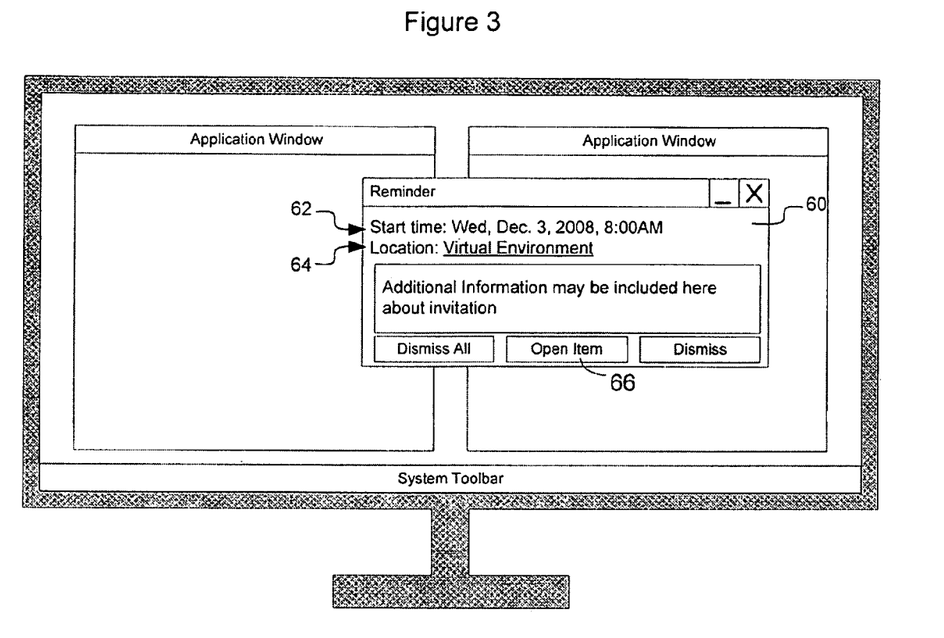
FIG. 3 is a diagram showing an example of an invitation that has been served to a user of a virtual environment according to an embodiment of the invention.

According to one embodiment, as shown in FIG. 3, invitations to meet in a virtual environment may be included as invitations in the user's calendar program. The calendar can then generate, at the designated time, a reminder window 60 to remind the user that they have been invited to meet another person in a virtual environment. The reminder window may indicate the start time 62, optionally an end time, and a location 64. In one embodiment, the location may contain a URI link to the virtual environment such that by opening the invitation (clicking on open item button 66), the user may have access to the URI link to the virtual environment. Assuming that the invitation is valid, when the user clicks on the URI embedded in the location 64, the user's computer will open the virtual environment client for that virtual environment and cause the user's Avatar to appear at the location associated with the URI within the designated virtual environment.

As can be envisioned, there are many ways of organizing invitations on the user's computer. For example, as shown in FIG. 2 the invitations may be organized within a virtual environment, may be organized in a separate window, or, as shown in FIG. 3, may be organized within another application such as a calendaring program. Other ways of organizing invitations may be developed as well and the invention is not limited to an implementation that organizes invitations in one of these particular described manners.

Figure 4:
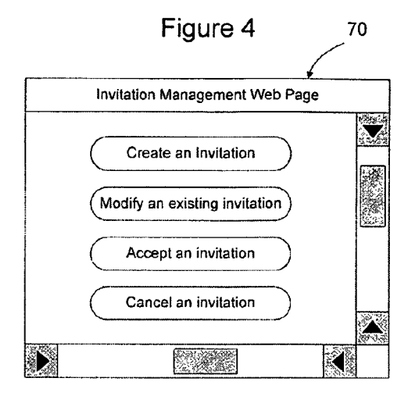
FIGS. 4 and 5 are diagrams showing example web pages that may be used to enable users of virtual environments to create invitations for other users according to an embodiment of the invention.

FIG. 4 shows an example invitation management web page that may be used to create invitations. As shown in FIG. 4, when a user wants to create an invitation, the user may use their browser to access the invitation management web site 70. The invitation management web site may include a sign-on process (not shown) to enable the user to log into their account on the invitation management web site. Once logged in, the invitation management web site will enable the user to take particular actions in connection with virtual environment invitations. In the example shown in FIG. 4, the invitation management web site includes links that will enable the user to create an invitation, modify an existing invitation, accept an invitation, or cancel an invitation. Other links and tools may be provided as well. Clicking on one of the tabs such as the modify tab may cause a list of outstanding invitations to be displayed, which may then be selected and operated on to enable the user to modify the selected invitation. Many different ways of organizing the invitation management web site may be implemented.

One advantage of using invitations is that the user can cancel the invitation if desired. Since the user has not provided the invitation recipient with any contact information, the invitation recipient cannot use the invitation or any aspect of it to find the user once the user has canceled the invitation.

Figure 5:
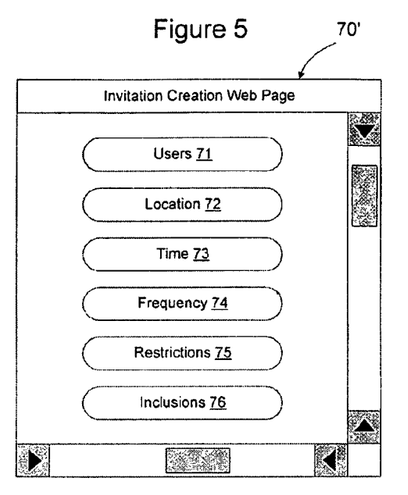

FIG. 5 shows a screen that may be displayed if the user elects to create an invitation. This screen may be accessed by clicking on the button "Create an Invitation" link in FIG. 4. When the user clicks on this link, a new screen is displayed that enables the user to specify the users 71, location parameters 72, time parameters 73, frequency 74, restrictions 75, and optionally whether the invitation is specific to that user 76.

The users tab 71 enables the invitation sender to specify who the invitation applies to. The invitation sender may specify the invitees by entering information manually or by accessing a list such as a directory of contacts. Preferably, the invitees may be identified using a universally unique identifier. Optionally, a virtual environment addressing system may be developed to enable people to be located within the virtual environment. The addressing system may be created for the invitation management system or may be based on an extant addressing system such as the existing telephone number addressing system and email addressing system.

The locations tab 72 is an optional tab that enables the invitation sender to specify a particular virtual environment and location within the virtual environment where the users should meet. This tab is optional, as often the invitation will be to meet the user wherever the user happens to be at the particular point in time. However, where the invitation is location specific, the user may specify the location using the location tab. The locations tab may also be used to specify negative locations where the invitation sender does not want to be met. For example, the invitation sender may want to send out an invitation to an invitation recipient to have the invitation recipient join him in any virtual environment except for a particular place. The invitation sender may use the location tab to specify the negative location. If the invitation recipient attempts to accept the invitation while the user is in the blacked-out location, the invitation management system will prevent acceptance of the invitation and optionally may send the invitation sender a message that someone is trying to find him.

Inclusion of a location tab complicates generation of invitations, since the user must specify not only the time, but also the particular place within one or more virtual environments. This requires the invitation to contain a link to a particular spot within a virtual environment. There may be many different ways to generate this type of information. For example, where the user is currently in the virtual environment and their Avatar is at the location associated with the invitation place, the coordinates within the virtual environment may be automatically populated into the invitation. Alternatively, the locations tab may be manually populated or populated from a list of favorite locations generated by the invitation sender as the invitation sender previously negotiated through the virtual environments. In this embodiment, as the user moves about within virtual environments, the user may click on a tab to add particular locations to their list of favorite places. This list may be used by the sender to specify a particular place within one of the virtual environments as the meeting place for the invitation.

In another embodiment, clicking on the locations tab may bring up a list of available virtual worlds. By scrolling through the list the user may select a particular virtual world. Clicking on a desired virtual world may pull up a map of that virtual world. By clicking on the map the coordinates of the invitation within the particular virtual environment may be populated to the invitation. Other ways of obtaining coordinates within the virtual environments may be implemented as well.

If the invitation sender is allowed to specify a location in the invitation, the invitation sender may also include themselves in the invitation via the list users tab 71. By including themselves as invitees in the invitation, the invitation sender may invite themselves back to the particular place so that the invitation sender is not required to remember where everyone was meeting at the designated time.

The time parameters tab 73 may be used to specify a specific start time (i.e. any time after 7:00), a time range (i.e. any time between 7:00 and 10:00), an end time (i.e. any time before 10:00), a date, or any combination of these parameters.

The frequency tab 74 enables the user to specify whether the invitation is a one time invitation or is to occur more frequently. For example, a professor may wish to invite his students to a virtual environment representing a museum to enable the students to tour the museum as part of the class. The professor may use an invitation to occur every Tuesday evening for 12 weeks starting September 1. Other examples may be used as well. The frequency tab may thus specify how often the invitation should repeat, how many days or times the invitation should repeat, and other similar parameters.

The restrictions tab 75 may be used to specify any additional parameters. For example, the invitation sender may want to send an invitation to a business colleague to meet them in a business-related virtual environment. However, the person may not want the business colleague to be able to meet them in a social-related virtual environment. The restrictions tab may be used to specify any virtual environments the invitation does not apply to, or to otherwise restrict the universal applicability of the invitation. The restrictions tab may also be used to specify whether the invitation is personal or transferable. Although several particular examples of restrictions have been provided, other restrictions may be applied as well depending on the implementation of the particular system.

The restrictions tab may also be used to specify the type of invitation. Invitations may be to meet at a particular place or may be to form a group that will follow the invitation sender as the sender moves through and between virtual environments. The restrictions tab or another tab may be used to specify the type of invitation. Similarly, where the invitation is to follow the invitation sender (a follow-me invitation) the invitation sender may specify a number of times that the user's URI should be sent to the group, how long the group should stay together, or other restrictions on formation and maintenance of the group. Other types of invitations may be generated as well.

In the example shown in FIG. 5, an additional tab has been provided through which the invitation sender may specify whether the invitation is specific to the invitation recipient or whether the invitation recipient may also bring other people. For example, the invitation sender may use the inclusions tab 76 to specify that the invitation recipient may forward the invitation on to three of their friends. The inclusions tab may be used to broaden the invitation's applicability beyond the particular invitation recipient so that it may be accepted by users other than the particular invitation recipient specified via the users tab 71.

Figure 7:
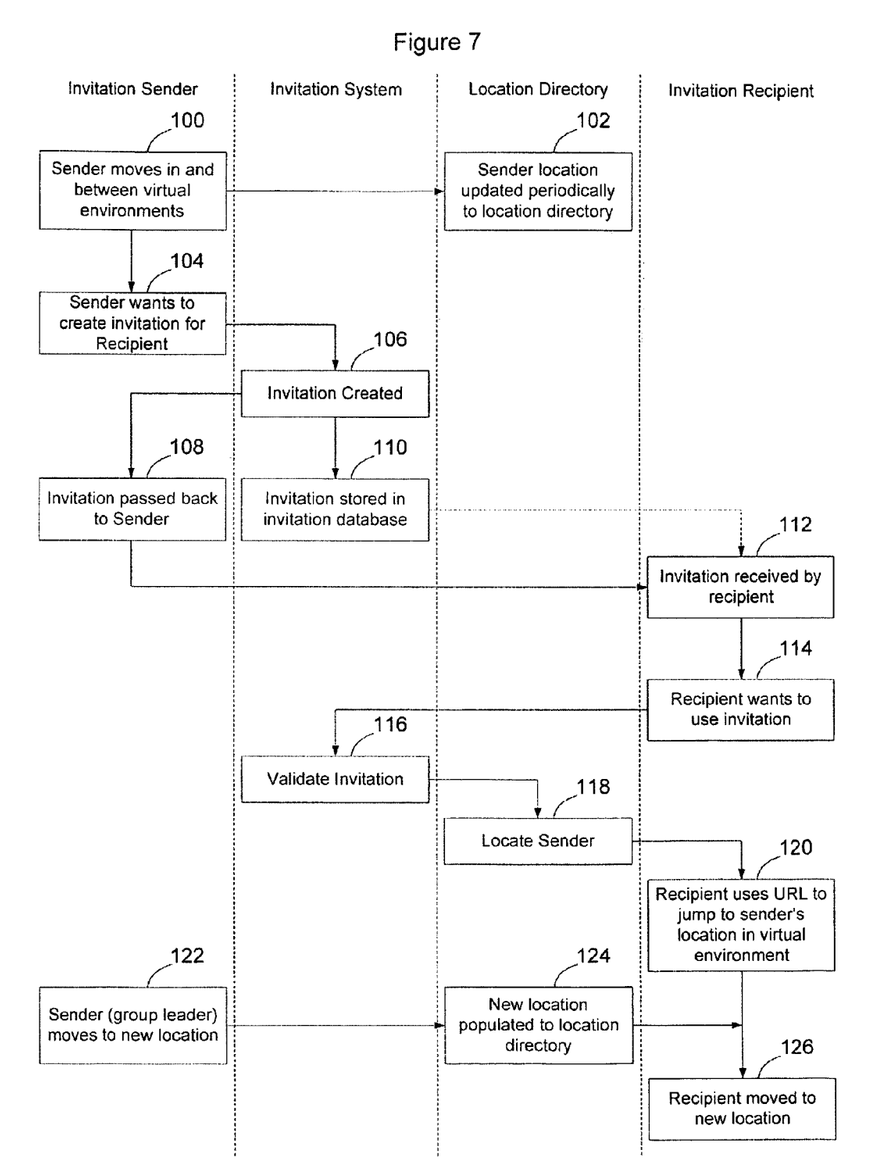
FIG. 7 is a flow chart of an example process that may be used to people to find each other and stay together as they navigate within and between multiple virtual environments according to an embodiment of the invention.

FIG. 7 shows a process that may be used to enable invitations to be generated and used to enable people to find each other within a virtual environment. As shown in FIG. 6, as the user (invitation sender) moves in and between virtual environments (100), the invitation sender's location will be periodically updated to the invitation management service 80 and stored in the location database 88 (102).

If invitation sender would like to create an invitation for an invitation recipient (104), the invitation sender will use the invitation creation section 82 of the invitation management system 80 to create an invitation (106). The invitation will then be sent back to the invitation sender (108) and a copy will be stored in the invitation database 86 (110). The invitation sender may then send a copy of the invitation to the invitation recipient (112) or optionally the invitation system may send the invitation to the invitation recipient.

In one embodiment, the invitation includes a URI that the invitation recipient can click on to accept the invitation. When the invitation recipient wants to use the invitation (114), the invitation recipient will click on the URI to tender the invitation to the invitation management system. This will cause the invitation to be validated by the invitation validity verification portion 84 of the invitation management system 80 (116). If the invitation is valid, the invitation sender's current location will be obtained from the location directory, e.g. by accessing location database 88 (118). The invitation recipient will then be directed to the invitation sender's current location in one of several virtual environments (120) so that the invitation recipient may jump to the invitation sender's current location in virtual environment.

The invitation may be to meet in the virtual environment. The invitation may also be used to enable groups to form and follow each other within the virtual environment. The same invitation creation process may be used to create a "follow me" invitation as may be used to create a "meet me" invitation. When an invitation sender sends a "follow me" invitation, the invitation is for the other users to meet the user and stay with the user as that user navigates through a particular virtual environment or moves from one virtual environment to the next.

When a user receives a follow me invitation, the user may use the invitation to meet with the group leader. The user's client will then periodically check the invitation to see if the group leader has moved and move to join them if they have moved too far away. If the user's client software doesn't support this feature, the user can simply click on the original invitation to catch up with the group leader whenever the user falls too far behind.

Assume, as shown in FIG. 7, that the two users have met in the virtual environment (120). If the invitation is a follow me invitation, and the invitation sender is the group leader, as the invitation sender moves to a new location (122) the invitation sender's location will be populated to the location directory (124). Each time the invitation sender moves to a new location, the location directory will forward a URI to the invitation recipient to cause the invitation recipient to move to the same location (126). Alternatively, the user may poll the location directory to obtain the new URI. In this way the invitation recipient may move together with the invitation sender within or between virtual environments.

Although it was assumed in this example that the invitation sender was the leader of the group, the invitation sender may specify another person to be the leader of the group such that as the other person moves, all other group members will be provided with URIs of the group leader's position and are thus able to move with the group leader.

By allowing invitations to be used to form groups, an invitation sender may establish a group quickly and easily simply by creating an invitation. The invitation may specify the duration that the group should stay together as well as other parameters similar to a normal invitation.

Since the location directory maintains the location of the group leader and causes all other members of the group to move to the leader's current location, it is OK if one or more members of the group join at a later point in time. For example, assume that a tour guide would like to guide ten people on a one hour tour through a set of virtual environments starting at 10:00. The tour guide could send out an invitation to the ten other users to invite them to join the tour. Assume that seven of the ten people accepted the invitation at 10:00 and met up with the tour guide at the start of the tour. As the tour guide moves through the various virtual environments, the tour guide's location will be updated and stored in the location directory. These movements will be conveyed to the other seven users so that the other seven users can follow the tour guide between the virtual environments. If one of the other three latecomers later decides to accept the invitation, say at 10:30, the user may simply click on the URI contained in the invitation. The location directory will determine the current location of the tour guide and pass that location to the latecomer. The latecomer will thus be able to join up with the rest of the group even though he wasn't able to join the first part of the tour.

Figure 8:
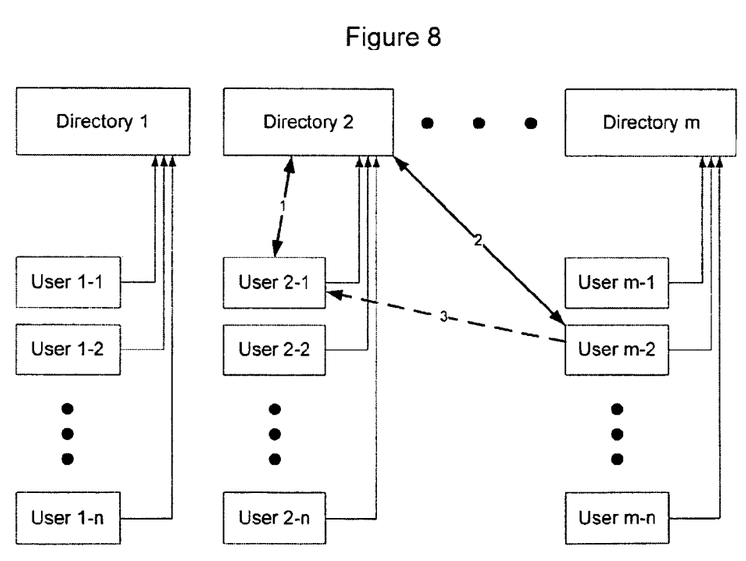
FIG. 8 is a functional block diagram illustrating an embodiment employing multiple directories according to an embodiment of the invention.

In the previous examples, a single directory was used to explain how invitations could be created, accepted, and used to enable users to meet each other and follow each other in and between virtual environments. The invention is not limited to the use of a single directory, but rather any number of directories may be used. FIG. 8 shows an embodiment in which multiple directories (directories 1-$m$) each support a subset of users. For example, directory 1 supports users 1-1 through 1-$n$, directory 2 supports users 2-1 through 2-$n$, etc. Each user subscribes to a directory and updates their location with the directory as they move within the virtual environment. Each user also uses their directory to create invitations as described above.

Users can send invitations to other users that also subscribe to the same directory or to other users who do not subscribe to the same directory. For example in FIG. 8, assume that user 2-1 would like to create an invitation that is to be sent to user m-2. User 2-1 would access his directory (directory 2) to create the invitation (arrow 1). The invitation will be sent to user m-2 who will accept the invitation (arrow 2). If approved, the user will be redirected by directory 2 to user 2-1's location. Thus, invitations may be sent to users who do not subscribe to the directory on which the invitation was created or, indeed, who don't subscribe to any directory.

To enable clients to provide location updates to the directories, the directories preferably have a standardized location update interface. Having a standardized location update interface enables multiple virtual environment clients to provide updates to the directories so that each directory may support users in multiple virtual environments. In this embodiment, whenever an update is required the user may send a http request to the directory with a session key for the user's Avatar and the URI for their current location.

Although particular modules and pieces of software have been described in connection with performing various tasks associated with enabling people to find each other and stay together in three dimensional computer-generated virtual environments, the invention is not limited to this particular embodiment as many different ways of allocation functionality between components of a computer system may be implemented. Thus, the particular implementation will depend on the particular programming techniques and software architecture selected for its implementation and the invention is not intended to be limited to the one illustrated architecture.

The functions described above may be implemented as one or more sets of program instructions that are stored in a computer readable memory and executed on one or more processors within on one or more computers. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a memory chip, computer memory, memory stick, disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer-implemented method for enabling people to find each other within a plurality of unrelated computer-generated three dimensional virtual environments, the method comprising the steps of:

implementing an invitation management system independent of any of the plurality of unrelated computer-generated three dimensional virtual environments, the invitation management system being configured to enable users to locate each other within the plurality of unrelated computer-generated three dimensional virtual environments;

maintaining, by the invitation management system, a database of user Avatar locations, the database of user Avatar locations being updated with current user Avatar location information as the users' Avatars move within the plurality of unrelated computer-generated three dimensional virtual environments, the current user Avatar location information enabling the invitation management system to determine where the users' Avatars are located within the plurality of unrelated computer-generated three dimensional virtual environments;

receiving, by the invitation management system, an invitation from an invitation sender directed to one or more invitation recipients;

communicating, via email or instant message, information associated with the invitation to the one or more invitation recipients;

receiving, via email or instant message, one or more invitation acceptance responses by the invitation management system from the one or more invitation recipients;

validating the one or more invitation acceptance responses by the invitation management system;

obtaining, by the invitation management system, invitation sender current Avatar location information associated with the invitation sender current user Avatar location from the database of user Avatar locations; and for each invitation acceptance response that is determined to be valid, transmitting a response by the invitation management system to the corresponding invitation recipient, the response containing the invitation sender current Avatar location information to enable the one or more invitation recipients to find the invitation sender within one of the plurality of unrelated computer-generated three dimensional virtual environments.

2. The computer-implemented method of claim 1, wherein the invitation recipient does not have location information stored in the database.

3. The computer-implemented method of claim 1, wherein the database of user Avatar locations receives user location input from each of the plurality of unrelated computer-generated three dimensional virtual environments.

4. The computer-implemented method of claim 1, wherein the invitation is an invitation to meet at a particular time in the future and is not tied to a particular location in any one of the plurality of unrelated computer-generated three dimensional virtual environments.

5. The computer-implemented method of claim 1, wherein the response contains a link to direct an Avatar associated with the invitation recipient to be moved to the current location of the Avatar associated with the invitation sender.

6. The computer-implemented method of claim 5, wherein the Avatar associated with the invitation recipient is automatically moved to the current location of an Avatar associated with the invitation sender upon selection of the link.

7. The computer-implemented method of claim 5, wherein the current location of the Avatar associated with the invitation sender is in a first of the independent computer-generated three dimensional virtual environments and the invitation recipient is in a second of the independent computer-generated three dimensional virtual environments.

8. The computer-implemented method of claim 1, wherein the step of maintaining a database of user Avatar locations comprises collecting Avatar location updates in the form of Uniform Resource Indicators.

9. The computer-implemented method of claim 8, wherein the invitation to one or more invitation recipients includes a Hyper Text Transfer Protocol (HTTP) based Uniform Resource Locator (URL) which the invitation recipient may click to accept the invitation.

10. The computer-implemented method of claim 1, further comprising the step of not enabling the one or more invitation recipients to learn the current location of an Avatar associated with the invitation sender if the invitation has been canceled.

11. The computer-implemented method of claim 1, further comprising the step of not enabling the one or more invitation recipients to learn the current location of an Avatar associated with the invitation sender if the invitation has expired.

12. The computer-implemented method of claim 1, further comprising the step of not enabling the one or more invitation recipients to learn the current location of an Avatar associated with the invitation sender if the invitation response is transmitted at an incorrect time.

13. The computer-implemented method of claim 1, wherein the invitation is an invitation to meet and follow the invitation sender to enable a group to be formed.

14. The computer-implemented method of claim 13, wherein the invitation enables the one or more invitation recipients to obtain the current location of the invitation sender repeatedly over a period of time to enable the invitation recipient to stay with the invitation sender.

15. A computer-implemented method for enabling people to find each other between a plurality of unrelated computer-generated three dimensional virtual environments, the method comprising the steps of:

implementing an invitation management system independent of any of the plurality of unrelated computer-generated three dimensional virtual environments to process invitations sent by invitation senders to invitation recipients, at least some of the invitations containing requests for the invitation recipients to join the invitation senders at the invitation sender's location within one of the computer-generated three dimensional virtual environment;

maintaining, by the invitation management system, a database of user Avatar locations, the database of user Avatar locations being updated with current user Avatar location information associated with the invitation senders as the users' Avatars associated with the invitation senders move within the plurality of unrelated computer-generated three dimensional virtual environments, the current user Avatar location information enabling the invitation management system to determine where the users' Avatars are located within the plurality of unrelated computer-generated three dimensional virtual environments;

receiving, by the invitation management system, an invitation from an invitation sender directed to one or more invitation recipients;

communicating, via email or instant message, information associated with the invitation to the one or more invitation recipients;

receiving, via email or instant message, one or more invitation acceptance responses by the invitation management system from the one or more invitation recipients;

processing the one or more invitation acceptance responses by the invitation management system, the step of processing the one or more invitation acceptance responses comprising obtaining, by the invitation management system, invitation sender current Avatar location information associated with the invitation sender Avatar from the database of user Avatar locations;

using the invitation sender current Avatar location information associated with the invitation sender to enable the invitation recipient Avatar to join the invitation sender Avatar at the invitation sender current Avatar location within one of the plurality of unrelated computer-generated three dimensional virtual environments.

\* \* \* \* \*